July 19, 1949.　　　　F. McINTYRE　　　　2,476,505
LINING FOR BALL MILLS
Filed Oct. 1, 1945　　　　　　　3 Sheets-Sheet 3
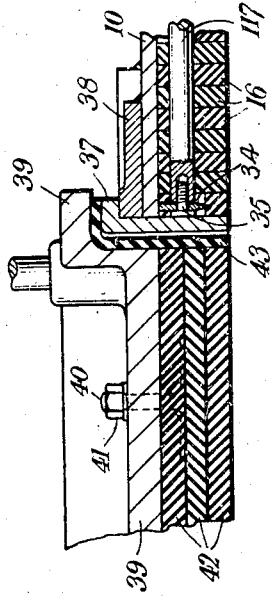
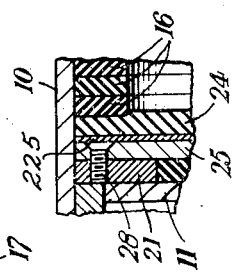
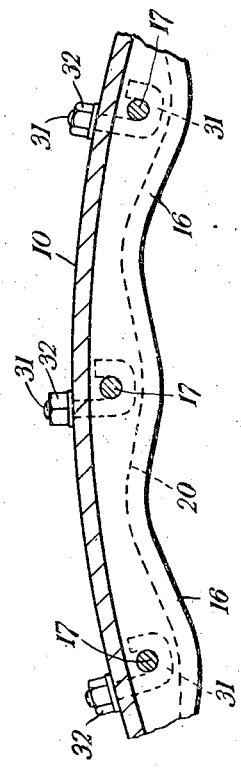
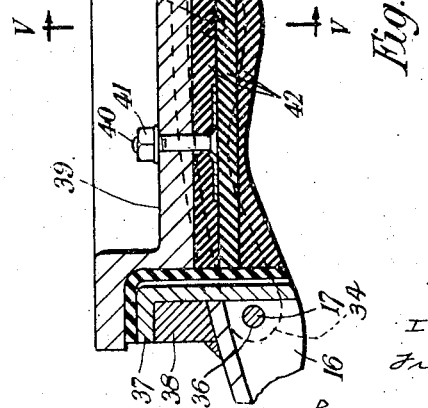
INVENTOR
Frank McIntyre
By Watson, Cole,
Grindle & Watson Patented July 19, 1949

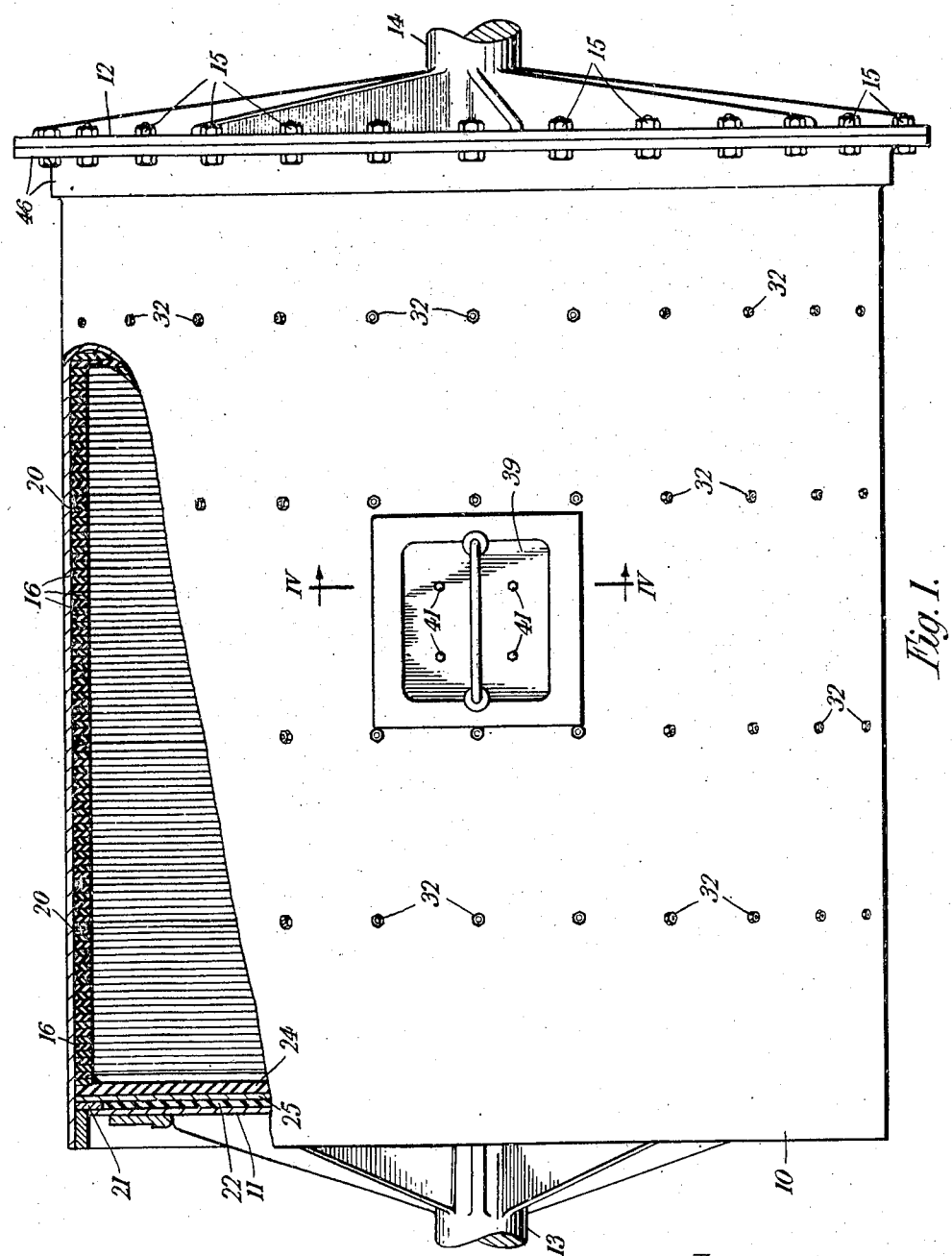

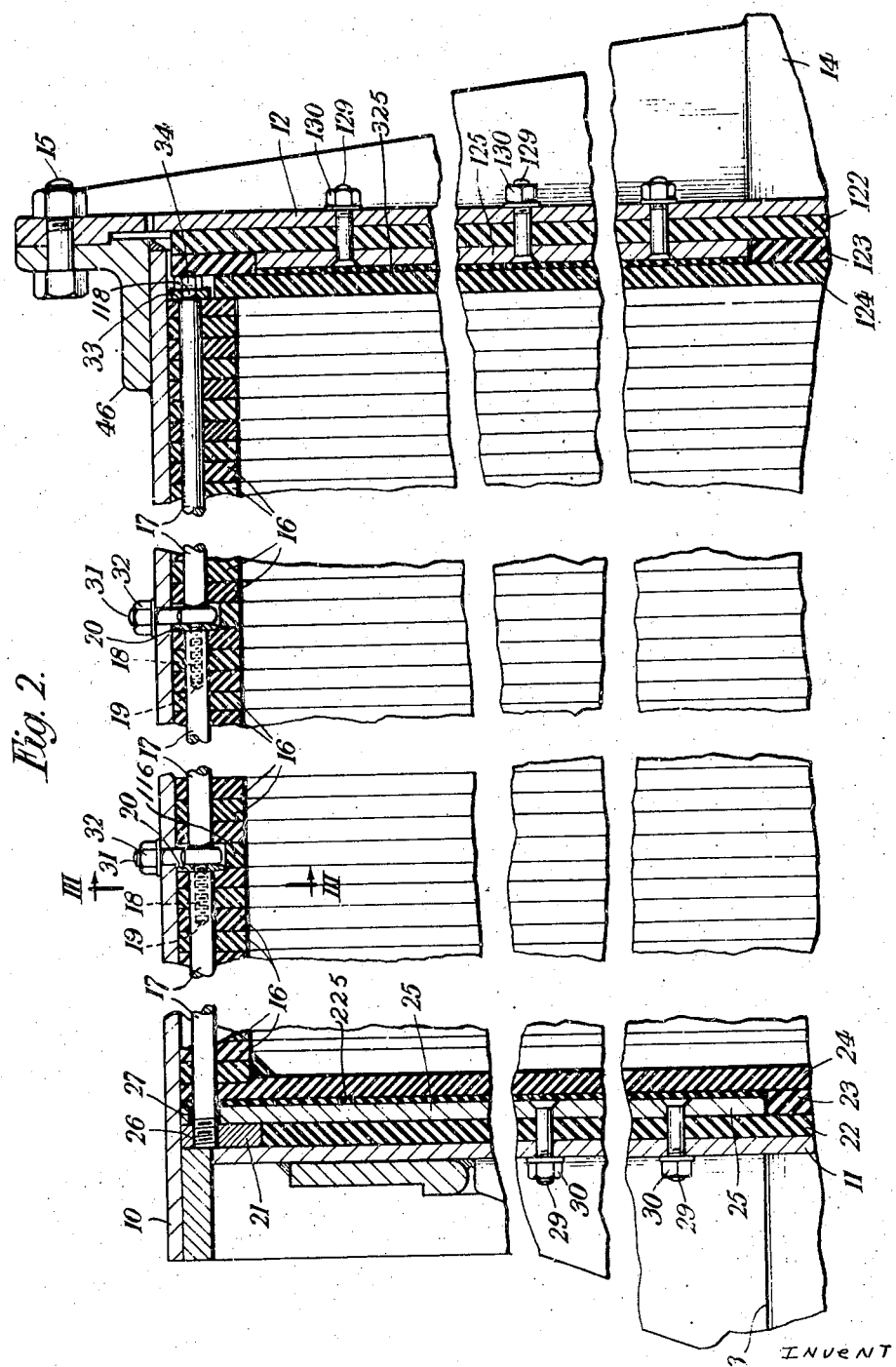

2,476,505

UNITED STATES PATENT OFFICE 2,476,505

LINING FOR BALL MILLS

Frank McIntyre, London, England, assignor to Wilkinson Rubber Linatex Limited, London, England Application October 1, 1945, Serial No. 619,560
In Great Britain October 20, 1944

2 Claims. (Cl. 241—182)

Ball mills, pebble mills and like machines for use in grinding ores and ceramic and other materials have a rotary metal tumbler drum, and it has been proposed to line the drums of such machines with rubber for the purpose of protecting the same against abrasion by the contents of the drum and of preventing metallic contamination of the contents of the drum.

Effective bonding and/or anchorage of the rubber lining to the metal drum has however been difficult to achieve because of the tremendous shearing forces to which the lining is subjected in use. Also difficulties have arisen due to fatigue or breaking away of the rubber where it contacts with and is secured to the rigid metal surface.

The object of this invention is to provide a more effective form of rubber lining for the metal drums of machines of the above character than those at present in use.

The lining according to the invention comprises a number of rubber rings mounted in axial compression on longitudinally extending rods attached at their ends to end plates or rings by which the lining is held in position in the drum. The rods and end plates or rings are preferably of steel or other metal, and the rods are preferably of circular section.

The rubber, being mounted in axial compression, is better able to resist abrasion than is a lining of rubber bonded to the drum. Fatigue of the rubber is likewise reduced, as compared with existing linings, because it is not necessary for the rubber rings to be bonded to the metal of the drum, since the lining can be located and maintained in position by the end rings, as hereinafter described in greater detail.

In order to secure effective compression of the rubber rings, in the case of a drum of any substantial length, the rods are formed of sections, adapted to be screwed together at joints located in the same transverse plane and a metal ring is provided at each joint plane for holding in compression the rubber rings mounted on the several rod sections. Preferably hook bolts, introduced through holes in the metal drum, are provided, these embracing the rod sections and abutting against the metal rings to assist them in maintaining the rubber rings in compression. The metal rings and hook bolts also serve to conduct heat from the rubber lining to the exterior of the drum.

One specific embodiment of the invention will now be described in greater detail, by way of example, with reference to the accompanying drawings, in which Fig. 1 is a side elevation, partly in section, of a ball mill tumbler drum fitted with a lining according to the invention, Fig. 2 is an enlarged part vertical section through the drum, Fig. 3 is a section on the line III—III in Fig. 2, Fig. 4 is an enlarged section on the line IV—IV in Fig. 1, Fig. 5 is a section on the line V—V in Fig. 4, and Fig. 6 is a detail sectional view showing the attachment of the outer end of one of the stiffening bars to the left-hand end ring.

The tumbler drum has a cylindrical metal body 10, to which are fitted end plates 11, 12 carrying trunnions 13, 14. The left-hand end plate 11 is permanently secured to the body 10, as by welding, while the right-hand end plate 12 is removable, being detachably secured by nut and bolt connections 15 to an angle section ring 46 welded to the right-hand end of the body 10.

The lining for the body 10 of the drum consists of a plurality of rubber rings 16 held in compression within the drum but not bonded to the inner surface thereof. These rings are threaded on to a plurality of longitudinally extending steel rods, of which there are twenty-six in all, spaced at equal intervals around the inner periphery of the drum. Each rod is built up of a number of sections 17, each having at one end a screw-threaded shank 18 and at the other a screw-threaded socket 19 for accommodating the shank end of the adjoining section. The connections between the adjoining sections 17 of all rods are located in common transverse planes defined by metal rings 20 which are located at these positions, and serve to hold the rubber rings 16 on each set of rod sections 17 in compression when the rod sections are screwed together.

To introduce the lining, the right-hand end plate 12 is removed, and an end ring 21 of metal, drilled with holes which are afterwards tapped, is welded to the fixed end plate 11. Then a protective layer consisting of three rubber plies 22, 23, 24, and embodying sixteen equally spaced radially extending stiffening bars 25 is fitted to the inner face of the end plate 11. A rubber filler element 225 is disposed between the bars 25 and the ply 24. The first set of rod sections 17 is then screwed into tapped holes 26 in the end ring 21. The rod sections 17 at the top and bottom of the drum pass through holes 27 at the outer ends of the vertically extending stiffening bars 25, one only of which is shown in Fig. 2. The other stiffening bars 25 are secured at their outer ends to the end ring 21 by set screws 28 as shown in Fig. 6. At their inner ends the stiffening bars 25 are secured to the end plate 11 by buried bolts 29 and nuts 30.

After the required number of rubber rings 16 (in the case illustrated twenty-two) have been placed on the first set of rod sections 17, the next series of rod sections is screwed into the sockets 19 at the ends of the first series, thereby causing a metal ring 20 placed over the threaded shanks 18 of the next series to compress the first set of rubber rings 16. As indicated, the metal ring 20 is of greater internal diameter than the rubber rings 16 so that it will be effectively enclosed within the rubber lining and protected from contact with or contamination by the contents of the drum by reason of the compression of the rubber rings on either side of it.

Hooked bolts 31 are introduced into position from inside the drum to embrace the rod sections 17, these bolts projecting through apertures in the drum 10 and being held in position by external nuts 32. The hook bolts contact the exposed surface of the metal ring 20 and assist it to maintain in compression the rubber rings 16 to the left of it.

A series of rubber rings 16 is then placed on the next series of rod sections 17, the first rubber ring 116 of this next series being cut away as shown to accommodate the hook bolts. This procedure of assembly is followed until all the rod sections have been assembled, but the last set of rod sections have threaded shanks 118 at their right-hand ends in place of sockets. A second metal end ring 33 is fitted over these shanks 118 and held in position to compress the last set of rubber rings 16 by nuts 34 fitted to the shanks 118.

The removable end plate 12 is provided on its inner face with a protective cover comprising three superposed plies 122, 123, 124 of rubber, and sixteen radially extending stiffening bars 125, with a rubber filler element 325 between the bars 125 and the ply 124, the stiffening bars being fixed to the end plate 12 by buried bolts 129 and nuts 130.

At the centre of the drum and at the top thereof in the position illustrated is a rectangular loading and inspection aperture. At this locality the topmost rod section 117 (Fig. 5) is interrupted and the rubber rings 16 are cut away. At the transversely extending sides of the inspection aperture are located a pair of metal segments 44, one of which only is shown in Figs. 4 and 5. These segments are supported centrally each on one end of the interrupted rod section 117 and held thereto by a screw 35 introduced into a socket in the rod section, so as to keep in compression the rubber rings at either side of the aperture. The adjoining rod sections 17 pass through holes 36 near the extremities of the segments 34. The sides of the aperture are defined by a removable rectangular angle-section metal framework 37, which is inserted into the cutaway portion of the lining and rests on a saddle piece 38 welded to the drum. The cover plug for the aperture is constituted by a metal plate, to which are secured by buried bolts 40 and nuts 41 three discs 42 of rubber. The cover also carries a rubber skirt 43. By tightening the nuts 41 the rubber portion of the cover can be expanded into tight engagement with the sides of the aperture. The lower surface of the bottom rubber disc 42 of the cover plug mates up with the inner surface of the rubber lining when the plug is in position. The inner periphery of the rubber rings is of sinuous form, the crests of the wave formation lying opposite the rods so that the effective thickness of the rubber is everywhere the same as shown in Fig. 3. The bottom disc 42 of the cover plug is therefore of corresponding sinuous form as shown in Fig. 4.

Any desired type of rubber, either natural or synthetic, may be used in the construction of the lining but I prefer to employ the material sold under the Registered Trade Mark "Linatex" because of its especially high resistance to abrasion. This material is manufactured by the process described in British Patent No. 437,928. Another form of rubber having a high degree of resistance to abrasion and particularly suitable for my purpose is that made by the process described in U. S. Patent No. 2,358,195.

Rubber linings constructed in accordance with the invention are also suitable for lining the tumbler drums of rotary washers or of concrete mixing machines. In the latter case, the rubber will not only act to resist abrasion but also to reduce the tendency of the material to cake. Linings according to the invention may also be of use where the drum is to contain chemicals which corrode metal but do not attack rubber.

What I claim as my invention and desire to secure by Letters Patent is:

1. A rotary metal tumbler drum, having a removable rubber lining, said lining comprising a plurality of circumferentially spaced longitudinally extending rods, said rods being formed in sections screwed together at joints located in common transeverse planes, a plurality of rubber rings threaded on said rods, a plurality of metal rings, each fitted to the rods at one of the joint planes and having its inner edge shrouded by the rubber, and end members for holding said rubber rings in axial compression on said rods, said rod sections having cooperating spigot and socket ends arranged, when the rod sections are screwed together, to locate said metal rings in position to hold in axial compression the rubber rings disposed between each adjoining pair of metal rings.

2. A rotary tumbler drum, comprising a metal shell, a pair of end plates one of which is fixed and the other detachable from the shell, and a removable rubber lining for the shell, said lining comprising a plurality of circumferentially spaced longitudinally extending rods, said rods being formed in sections screwed together at joints located in common transverse planes and in screw threaded engagement with said fixed end plate, a plurality of rubber rings threaded on said rods, a plurality of metal rings, each fitted to the rods at one of the joint planes and having its inner edge shrouded by the rubber, and means fitted to said rods at the ends thereof adjoining said detachable end plate for maintaining, in cooperation with said fixed end plate, said rubber rings in axial compression on said rods, said rod sections having cooperating spigot and socket ends arranged, when the rod sections are screwed together, to locate said metal rings in position to hold in axial compression the rubber rings disposed between each adjoining pair of metal rings.

FRANK McINTYRE.

(References on following page)

REFERENCES CITED

The following references are of record in the file of this patent:

UNITED STATES PATENTS

| Number | Name | Date |
|---|---|---|
| 151,338 | Alsing | May 26, 1874 |
| 190,389 | Trumbull | May 1, 1877 |
| 673,768 | Fleming | May 7, 1901 |
| 712,531 | Hewlett | Nov. 4, 1902 |
| 937,826 | Lindhard | Oct. 26, 1909 |
| 1,120,108 | Warwick | Dec. 8, 1914 |
| 1,553,328 | Roubal | Sept. 15, 1925 |
| 1,601,956 | Gammeter | Oct. 5, 1926 |
| 1,607,828 | Holthoff | Nov. 23, 1926 |
| 1,921,672 | Haushalter | Aug. 8, 1933 |
| 2,058,257 | Porteous | Oct. 20, 1936 |
| 2,357,246 | Whitmyer | Aug. 29, 1944 |

FOREIGN PATENTS

| Number | Country | Date |
|---|---|---|
| 251,646 | Italy | Sept. 25, 1925 |

OTHER REFERENCES

Engineering and Mining Journal-Press, Sept. 1924, vol. 118, No. 12, page 476, McGraw-Hill Co. Inc., 10th Ave. at 36th St., New York City.